United States Patent [19]

Porcher et al.

[11] Patent Number: 4,667,307

[45] Date of Patent: May 19, 1987

[54] CIRCUIT FOR SELECTING AND LOCKING IN OPERATION FUNCTION CIRCUITRY

[75] Inventors: Thomas C. Porcher, Stow, Mass.; Morgan E. Robinson, Hanover, N.H.; David B. Hughes, Hudson, Mass.

[73] Assignee: Digital Equipment Corporation, Maynard, Mass.

[21] Appl. No.: 551,009

[22] Filed: Nov. 14, 1983

[51] Int. Cl.⁴ .............................................. G06F 3/02
[52] U.S. Cl. ..................................... 364/900; 364/189
[58] Field of Search ... 364/200 MS File, 900 MS File, 364/189; 340/325, 825

[56] References Cited

U.S. PATENT DOCUMENTS

| | | | |
|---|---|---|---|
| 3,293,612 | 12/1966 | Ling | 364/200 |
| 3,530,440 | 9/1970 | Osborne | 364/200 |
| 3,725,877 | 4/1973 | Keil | 364/900 |
| 3,742,466 | 6/1973 | Hamm et al. | 364/900 |
| 3,860,808 | 1/1975 | Sakoda et al. | 364/200 |
| 3,973,244 | 8/1976 | Lovercheck et al. | 364/200 |
| 4,137,564 | 1/1979 | Spencer | 364/200 |
| 4,403,303 | 9/1983 | Howes et al. | 364/900 |

*Primary Examiner*—Gareth D. Shaw
*Assistant Examiner*—Christina Eakman
*Attorney, Agent, or Firm*—William E. Cleaver

[57] ABSTRACT

The present invention is circuitry which is employed with a data terminal which data terminal in turn is part of a system including a main data processor. The present circuitry includes a microprocessor which is connected to the main data processor and to the keyboard. The microprocessor processes signals from both the main data processor and the keyboard. The system has a plurality of operational function circuits, such as a circuit to effect smooth scrolling on a data display means. There is logic circuitry connected between the microprocessor and the operational function circuits. The logic circuitry provides a first path which permits signals, generated in response to instructions from the main data processor, to pass therethrough to select one of the operational function circuits and simultaneously therewith to turn the selected circuit either on or off. The logic circuitry also provides a second path which permits signals, generated in response to instructions from the keyboard to pass therethrough to select one of the operational function circuits and turn circuit either on or off. A circuit to generate an impeding signal is also included and is activated by signals from the microprocessor in response to signals from the keyboard. This last mentioned generator circuit is connected to impede signals which would otherwise be transmitted along said first path, whereby said keyboard, after selecting a particular operational function circuit, can "lock in" that circuit so that the main data processor cannot turn that selected circuit off.

8 Claims, 1 Drawing Figure

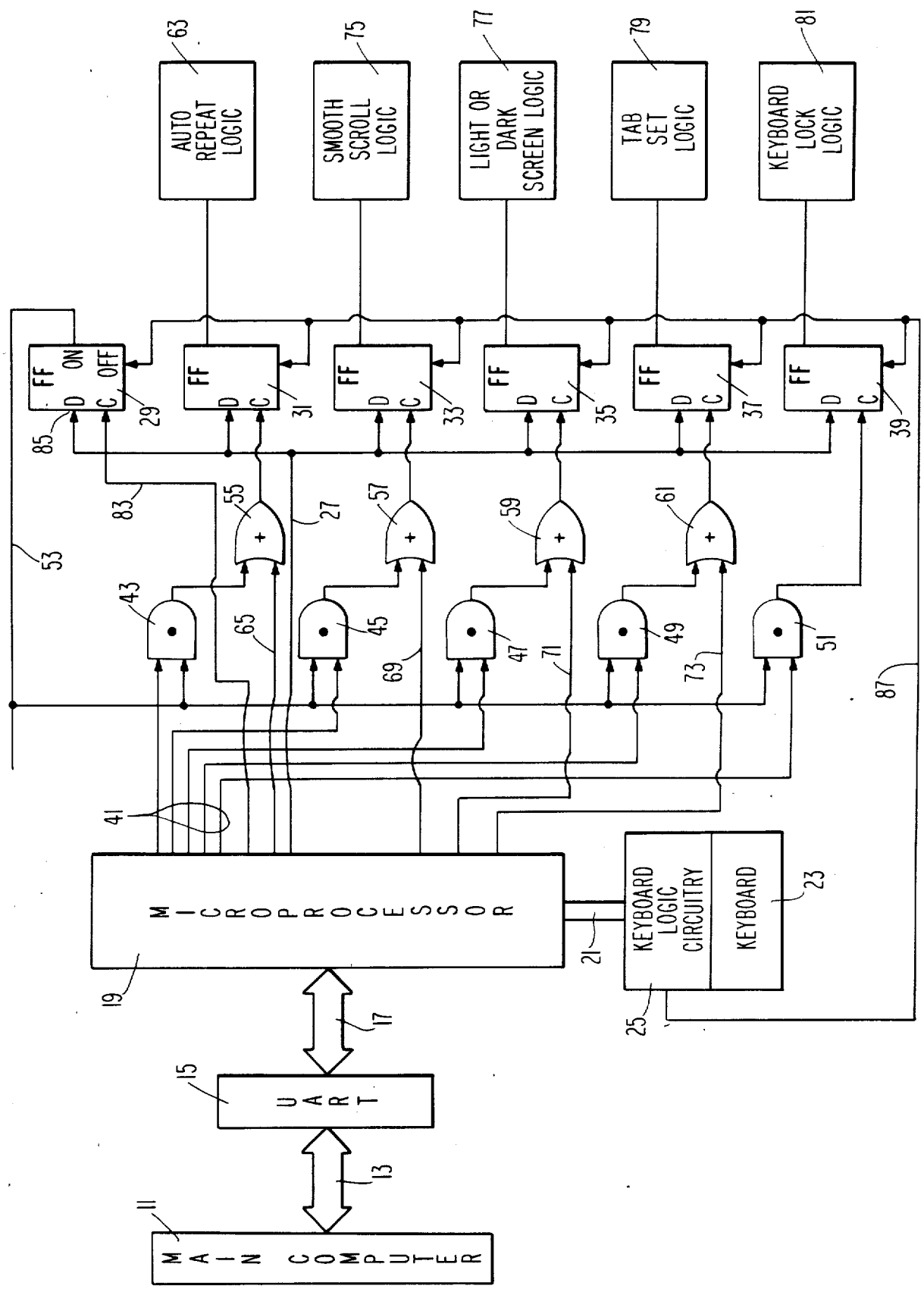

CIRCUIT FOR SELECTING AND LOCKING IN OPERATION FUNCTION CIRCUITRY

BACKGROUND

In data processing systems which use data terminals, a common operation is to enable both the main data processor and the terminal to cause certain operational function circuits to be activated or in the alternative to be turned off. With the great flexability of such systems, in the prior art, it is possible to have the main data processor terminate the operation of a certain function at a terminal although the user of the terminal in fact wants to continue to run that function. For instance, smooth scrolling, a data display device is such a function. Such a preemption of the terminal operation has often been at least a source of annoyance and in some cases has caused a loss of data. In the latter the data has to be regenerated. The present circuitry permits both the main data processor and the keyboard to turn the operational function circuits on and off, but also permits the keyboard to block the main data processor if the keyboard operator feels that the chosen operation at the terminal must continue.

SUMMARY

In a preferred embodiment of the present invention, a microprocessor is connected to both the main data processor and the keyboard. The microprocessor is formed to generate the first and second data signals. These signals are binary signals, with each data signal being assigned a different instruction. One such signal indicates that the functional operation circuit should be turned "off" while the other data signal indicates that the operational function circuit should be turned "on". The microprocessor generates the first and second data signals in response to either a keyboard request or instruction or in response to a main data processor request or instruction. In addition the microprocessor is formed to generate a plurality of first clock control signals in response to instruction signals from the main computer with each of said first clock control signals being assigned to a different operational function circuit. Further, in addition the microprocessor is formed to generate a plurality of second clock control signals in response to instruction signals from said keyboard. Each second clock control signal is assigned to a different operational function circuit. Logic circuitry is connected to process or to receive the first and second data signals and the clock control signals. The data signals select the "off" and "on" condition, while the clock control signals select the particular operational function circuit which is to be turned either "on" or "off". The present circuitry further includes, in a preferred embodiment, a bistable device which is connected to receive data signals and clock control signals which are the result of keyboard instruction only. This last mentioned bistable device can generate an impeding signal and the impeding signal is connected to impede the clock signals which are generated in response to instructions from the main computer. Thus while the main computer can select a particular operational function circuit to be turned "on" or "off", that capability can be blocked by instruction signals from the keyboard.

The features and objects of the present invention will be better understood from the following descriptions taken in conjunction with the drawing.

In the drawing there can be seen a main computer 11 which is connected through a bidirectional channel 13 to a UART 15. The UART 15 is connected through a bidirectional channel 17 to a microprocessor 19. The microprocessor 19 is connected through a channel 21 to the keyboard 23. The keyboard 23 has a part thereof indicated as keyboard logic circuitry 25. In the preferred embodiment the microprocessor 19 is a T-11 manufactured by Digital Equipment Corp., while the keyboard is a LK201 manufactured by Digital Equipment Corp. The microprocessor 19 is inherently capable of generating binary data signals as well as a plurality of clock control signals. The binary signals generated by the microprocessor 19 represent a "turn on" signal for binary 1 and a "turn off" signal for a binary 0. The binary data signals are transmitted on the channel 27, to each of the "D" inputs of the flip-flops 29, 31, 33, 35, 37, and 39. The flip-flops 29, 31, 33, 35, 37 and 39 are "D" type flip-flops and in the preferred embodiment are type 74LS74 manufactured by Signetics Corporation. It is well understood that a "D" flip-flop will change to the state indicated by the "D" input when a clock signal (to the "C" input) is present at the same time that the "D" input signal is present. It should be understood that the channel 27 could have a MUX so that the "D" signals generated by the main computer are separated from the "D" signals generated by the keyboard 23. Actually the MUX function takes place inside the microprocessor 19.

As can be seen in the drawing there is a plurality of lines 41 connected to the microprocessor 19. Each of the lines 41 is assigned and connected to a different one of the AND gates 43, 45, 47, 49 and 51. The other input to each of the AND gates 43, 45, 47, 49 and 51 comes from the flip-flop 29. If the flip-flop 29 is in the "off" condition the voltage on line 53 is high and hence a high signal present on any one of the channels 41 causes the associated AND gate to provide a high signal at its output. It should be understood that different voltages could be used and NAND gates could be used in place of the AND gates or other forms of logic could be employed all within the spirit of the present invention.

Further, as can be seen in the drawing, there are a number of OR gates 55, 57, 59 and 61. Each of the OR gates 55, 57, 59 and 61 is connected to an associated one of the AND gate 43, 45, 47 and 49. Hence if the AND gates, for instance, AND gate 43 has two high signals on its inputs then there will be a high signal on its output which will be transmitted to the OR gate 55 and in response an action clock signal is transmitted to the "C" input of the flip-flop 31. Each of the OR gates 55, 57, 59 and 61, as can be seen in the drawing, has a second input from the microprocessor 19 and each of those lines is connected to receive a different clock control signal from the microprocessor 19. If, for instance, the flip-flop 31 were to be selected for activation so that the auto repeat logic 63 would either be turned "on" or "off", then the signal to the "D" input of the flip-flop 31 would be correctly chosen (for either an "on" or an "off" condition) while the line 65 would be activated with a high signal to provide a high signal on line 67 to the "C" input of the flip-flop 31. The same operation would take place and the proper clock control signals would be generated in response to instruction signals from the keyboard and such signals would be found on the lines 69, 71 and 73. In this way the keyboard can select any one of the functional operational function circuits 63, 75, 77 and 79. It is equally true that the main computer 11 by selecting the proper one of the lines 41 can select any one of the operational function circuits 63, 75, 77, 79 and 81 provided of course that the AND gates 43, 45, 47, 49 and 51 or any of them is not impeded by the output from the flip-flop 29. The flip-flop 29 is the impeding signal generator. As indicated above, the flip-flop 29 has its "C" input connected to the microprocessor to receive clock control signals which are generated by the keyboard or from keyboard instructions only while the "D" input to the flip-flop 29 receives "D" signals from the keyboard instructions only. Hence if the user of the keyboard 23 has, for instance, selected the smooth scroll logic circuitry 75 and wants to make sure that the main computer, for whatever reason, doesn't turn the smooth scroll logic circuitry off, then the user will key an instruction to the microprocessor to generate a clock signal on line 83 and an "on" binary signal to the "D" input . Accordingly the flip-flop 29 will be transferred to its "on" side and hence there will be a low signal on line 53 which will impede or block each of the AND gates 43, 45, 47, 49 and 51. When the flip-flop 29 is transferred to its "on" side, the main computer cannot transmit any signals through the AND gates 43, 45, 47, 49 and 51 and hence none of the operational function circuits 63, 75, 77, 79 and 81 can be altered.

It should be noted that the flip-flop 39 does not have any input from an OR gate. Accordingly the keyboard cannot transfer the flip-flop 39 to its on side and hence turn the keyboard lock logic into an "on" condition. It is apparent from the above discussion and the presence of the AND gate 51 that the main computer can turn the flip-flop 39 to the on condition and thereby activate the keyboard logic circuitry 81. It should be understood that the keyboard lock logic circuitry can effectively turn the terminal off in the sense that if the keyboard is locked the terminal cannot transmit any data into the system. The main computer or the user of the main computer may want to keep information from being transmitted thereinto for a number of reasons. Accordingly the present circuitry enables the main computer to lock the keyboard out. On the other hand if the keyboard user wants to be sure that his keyboard logic continues, then he can send instructions to the microprocessor which will turn the "impeding flip-flop" 29 to its "on" condition. As described for the other AND gates the AND gate 51 would be blocked thereby not permitting the main computer to block the keyboard out. Philosophically, the system does not want to permit the keyboard to lock itself out and the circuitry is arranged (by not having an OR gate) to assure that such a keyboard lock out cannot happen.

As is further shown in the circuitry the keyboard logic circuitry 25 provides a reset signal on line 87 whereby when the system is initialized each of the flip-flops 29, 31, 33, 35, 37 and 39 is transferred to its reset side.

It should be understood that while the present invention is shown in an embodiment of logic elements such as the AND gates and OR gates and flip-flops, other logic arrangements could be used, or firmware could be used, or at least in part some of the logic operation accomplished by the circuitry shown on the drawing could be accomplished through programming techniques in the microprocessor. All of the foregoing are intended to be within the spirit of the present invention.

We claim:

1. In a terminal device which has a keyboard which is formed to generate instruction signals and which terminal device operates with a main data processor which is formed to generate instruction signals, and whcih terminal operates with a plurality of operational function circuits, a circuit for selecting and locking operational function circuitry, comprising in combination: microprocessor means connected to said main data processor and to said keyboard and formed to be capable of generating first and second data signals either in response to instruction signals from said main data processor or in response to instruction signals from said keyboard, said microprocessor further formed to generate either a plurality of first clock control signals in response to instruction signals from said main data processor or a plurality of second clock control signasl in response to instruction signals from said keyboard; logic circuitry providing an impedible signal path means over which said first clock control signals pass when not impeded to provide action clock signals and providing a second path over which said second clock control signals pass to provide action clock signals; switching circuitry means connected to said logic circuitry and to said microprocessor means and said operations function circuits to receive said first and second data signals and to receive said action clock signals whereby in response to a said first signal and an action clock signal a particular operational function circuit will be turned on and in respons to a said second data signal and an action clock signal a particular operational function circuit will be turned off; impeding signal generator means whose input means are connected to said microprocessor to receive said first and second data signals and to receive selected ones of said second clock control signals which are transmitted in response to keyboard instruction signals said impeding signal generator means having output means connected to said impedible signal path means whereby clock signals passing to said impedible signal path means are blocked from causing said switching circuitry means to cause an operational function, circuit is to be either turned "on" or "off".

2. In a terminal device which has a keyboard which is formed to generate instruction signals and which terminal operate with a main data processor which is formed to generate instruction signals and which terminal operates with a plurality of operational function circuits, a circuit for selecting and locking in operational function circuitry comprising in combination; microprocessor means connected to said main data processor and to said keyboard and formed to be capable of generating first and second data signals either in response to instruction signals from said main data processor or in response to instruction signals from said keyboard, said microprocessor further formed to generate a plurality of first clock control signals either in response to instruction signals from said main data processor or a plurality of second clock control signals in response to instruction signals from said keyboard; a plurality of first gate means, each formed to be impedible and each connected to said microprocessor to receive a different one of asid first clock control signal to respectively transmit them therethrough if said first gate means is not in an impeded state; a plurality of second gate means each connected to the output means of a different one of said first gate means to receive said first clock control signals therefrom and each connected to said microprocessor to receive a different one of said second clock control signals therefrom, each second gate means formed to transmit therethrough any clock control signal transmitted thereto; a plurality of bistable devices, each connected to a different one of said second gate means to receive clock control signals therefrom and each connected to said microprocessor means to receive either said first data signals; or said second data signals therefrom, each of said bistable devices having its output means connected to a different operational function circuit; and impeding signal generator means connected to said microprocessor means to receive either said first or said second data signals therefrom in accordance with instruction signals from said keyboard and to receive selected ones of said second block control signals, said impeding signal generator having output circuitry connected to said plurality of first gate means to transmit an impeding signal thereto to block signals from being generated at the respective outputs thereof, whereby said keyboard can block said main data processor from affecting the status of said operational function circuits.

3. In a terminal device, a circuit for selecting, and locking in, operational function circuitry according to claim 2 wherein each of said first gate means is an AND gate.

4. In a terminal device, a circuit for selecting, and locking in, operational function circuitry according to claim 2 wherein each of said second gate means is an OR gate.

5. In a terminal device, a circuit for selecting, and locking in, operational function circuitry according to claim 2 wherein said impeding signal generator means is a bistable circuit.

6. In a terminal device, a circuit for selecting, and locking, operational function circuitry according to claim 2 wherein there is further included an individual keyboard lock operational function circuitry and wherein there is further included an AND gate having one input connected to said impeding signal generator and another input connected to said microprocessor to receive certain ones of said first control clock signals said AND gate having an output means connected to said individual keybord lock operational function circuitry whereby said main data processor can lock out said keyboard and alternatively said keyboard can prevent said main data processor from effecting said lock out.

7. In a terminal device, a circuit for selecting, and locking in, operational function circuitry according to claim 2 wherein each of said bistable devices is a "D" type flip-flop, having a "D" input means and a "C" input means.

8. In a terminal device, a circuit for selecting, and locking in, operational function circuitry according to claim 7 wherein said first and second data signals are transmitted to said "D" input means of each of said bistable devices and wherein said first and second control clock signals are transmitted selectively to said "C" input means of associated bistable devices.

* * * * *